(12) United States Patent
Shalts et al.

(10) Patent No.: US 7,312,715 B2
(45) Date of Patent: Dec. 25, 2007

(54) MANAGEMENT OF LARGE SCALE CABLING SYSTEMS

(75) Inventors: David Shalts, Shoham (IL); Dael Govreen-Segal, Hod Hasharon (IL)

(73) Assignee: RIT Technologies Ltd., Tel-Aviv (IL)

( * ) Notice: Subject to any disclaimer, the term of this patent is extended or adjusted under 35 U.S.C. 154(b) by 272 days.

(21) Appl. No.: 10/926,776

(22) Filed: Aug. 26, 2004

(65) Prior Publication Data

US 2005/0078009 A1 Apr. 14, 2005

Related U.S. Application Data

(63) Continuation of application No. PCT/IL2004/000698, filed on Jul. 29, 2004.

(30) Foreign Application Priority Data

Jul. 31, 2003 (IL) .................................. 157203

(51) Int. Cl.
*G08B 21/00* (2006.01)
*G01R 19/00* (2006.01)
*B23P 21/00* (2006.01)
*G06F 1/16* (2006.01)

(52) U.S. Cl. ..................... 340/635; 340/650; 340/651; 340/652; 324/66; 29/700; 29/593; 261/686

(58) Field of Classification Search ................ 340/635, 340/650, 651, 652; 324/66; 29/700, 593; 361/686

See application file for complete search history.

(56) References Cited

U.S. PATENT DOCUMENTS

| | | | | |
|---|---|---|---|---|
| 3,705,347 A | * | 12/1972 | Tuller ........................... | 324/66 |
| 3,930,307 A | * | 1/1976 | Schotthoefer et al. ......... | 29/593 |
| 5,483,467 A | | 1/1996 | Krupka et al. | |
| 2003/0126735 A1 | * | 7/2003 | Taniguchi et al. ............ | 29/593 |

FOREIGN PATENT DOCUMENTS

| | | |
|---|---|---|
| WO | WO 02/47331 | 6/2002 |
| WO | WO 2004/044599 | 5/2004 |

* cited by examiner

*Primary Examiner*—Julie Bichngoc Lieu
(74) *Attorney, Agent, or Firm*—Pearl Cohen Zedek Latzer, LLP

(57) ABSTRACT

Method and system for managing cabling rooms that include a plurality of communication panels, which are arranged closely to one another. Each cabling room has a plurality of patch panels, structurally connected to form vertical structures. An operator is automatically guided to a communication panel or a plurality of communication panels, in which changes are to be made to modify the connectivity status or to deal with connectivity problems that may arise for any reason. The system automatically indicates to an operator optimal ports that are available and optimal patch cords for connecting them, based on distances between ports and on the electrical characteristics of the electrical signals that it is intended to pass between the ports.

19 Claims, 4 Drawing Sheets

MANAGEMENT OF LARGE SCALE CABLING SYSTEMS

RELATED APPLICATION

The present application is a continuation of International Application No. PCT/IL04/000698 filed Jul. 29, 2004, which claims priority from Israeli Patent Application No. 157203, filed Jul. 31, 2003, the contents of which are here incorporated in their entirety; applicant claim the benefit of 35 USC §120.

BACKGROUND OF THE INVENTION

1. Field of the Invention

The present invention relates to the field of cabling systems, More particularly, the present invention relates to a method for optimal management and control of interconnecting panels that are part of large scale cabling systems.

2. Prior Art

The term 'managing' (i.e., in connection with 'management of cabling systems', or 'communication panels', or 'patch panel') encompasses operations such as obtaining, and/or monitoring the connectivity status, or map, of a cabling system, and using the obtained data for guiding an operator through desirable cabling changes and indicating to the operator erroneous and unauthorized connections and disconnections of patch cords.

The term 'Patch Panels' refers to panels that include data and/or video/voice ports (hereinafter, briefly, "ports"), to which multiconductor cables (hereinafter referred to as 'Patch Cords') may be connected, for connecting between any two ports.

'Connectivity Status', or 'Connectivity Map', is an ensemble of data that indicates which patch cord's end is connected to which port in which patch panel. The connectivity status/map is normally contained within a storage array, for example, in a database.

'Connectivity status indicator' is an indicator, usually a light source that is located in proximity to a port. This indicator will be activated by a central management unit in order to mark to, e.g., a technician the port in cases where that port is involved in wanted, or unwanted, connectivity changes.

The term 'Scanning System' refers to a system for associating a first set of ends of patch cords to a corresponding second set of ends of patch cords. This could be obtained for example by transmitting Scanning Signals via the first set of ends of patch cords, and receiving the forwarded Scanning Signals via the second set of corresponding ends of patch cords. The scanning system may contain a database, the content of which is a data representing the connectivity status, or connectivity map, of the scanned cabling system, and updated according to the transmission of the Scanning Signals. A scanning system is described, for example, in U.S. 60/251,444 ("System for automatically identifying the physical location of network end devices"), in co pending Israeli Patent application No. IL 152768 ("Retrofit kit for interconnect cabling system"), and in U.S. Pat. No. 5,483, 467 ("Patching panel scanner").

Big organizations usually have large information systems that are supported by large scale cabling systems. A cabling system normally comprises a plurality of communication panels, each of which comprises several patch panels, preferably structurally connected to form vertical structures, a plurality of patch cords, which carry information (e.g., data, audio, TV signals, etc.), being connected to each patch panel. The communication panels allow flexibility in routing information from signals sources to different final users.

Large cabling systems, which could include thousands of patch cords that are connected to several dozen patch panels, cause several problems that are related to the management of such cabling systems. The two most common problems will now be pointed out:

There are no means for readily and quickly identifying ports to/from which patch cords are to be connected/disconnected, or are connected to cords which are defective or damaged. For example, if there is a problematic connection in one of the patch panels, a technician would have to visually inspect many patch panels in many communication panels. Such a visual inspection is laborious and time consuming, even if a technician uses a scanning system, such as the scanning systems referenced above, which is designed to activate visual connectivity status indicators per port. Therefore, it is a purpose of this invention to provide means for directing the technician to the communication panel of interest, and, thereby, keeping the technician from wasting inspection time on non-relevant communication panels.

Large cabling systems pose another major problem, which is non-optimal lengths of patch cords that are often utilized in them. In conventional cabling management systems there is no information relating to the physical location of the ports. Therefore, whenever a technician has to perform changes in the connectivity status of a cabling system, the technician usually takes with him several patch cords of different lengths, and chooses the "right" patch cord according to the distance between the relevant two ports which are to be interconnected. In a different situation, if one end of a patch cord is to be connected to a different port, the technician might find that the port, to which this end is to be connected, is too distant, and the patch cord is too short. Accordingly, the technician has, again, to choose a patch cord of the "right" length. In any case, the technician has to choose patch cords based on his intuition, and, therefore, such selection of patch cords may not be optimal. The non-optimal selection of patch cords has two consequences:

a. Technicians tend to take several patch cords of different lengths, and choose, eventually, patch cords that are a bit longer than required. As a result of this, managing the inventory is inefficient, money is wasted due to using patch cords that are longer than required, the technician has to carry with him unnecessary patch cords, and the whole process of handling the patch cords is time consuming, In addition, extra length of patch cords has to be arranged back and forth, and is space-consuming, which could leave smaller space for other patch cords.

b. The larger the bandwidth of a signal is, the more sensitive is the signal to the length of the cord in which the signal passes, because high frequency signals, or high frequency components thereof, tend to deteriorate as the cord gets longer. Accordingly, link performance may not be optimal because patch cords are currently chosen by a technician based on his intuition, rather than being chosen based on real electrical performance of the link, which should comply with the electrical characteristics of the signal passing through the link.

Therefore, it is another purpose of the invention to provide a method for determining the right type and length of patch cords prior to performing the connectivity changes by a technician.

It is, therefore, an object of the present invention to provide a method for saving a technician inspection time whenever there is a need to change the connectivity status of a large scale cabling system.

It is another object of the present invention to provide a method for automatically offering to technician patch cords of the right type and length prior to performing connectivity status changes.

It is a further object of the present invention to provide a method for automatically checking, after the connection of the patch cord, if said patch cord is of the right type and length.

It is a still further object of the present invention to provide a method for indicating to an operator, prior to connection of a patch cord, the available ports that would comply with the electrical characteristics of the electrical signal intended to pass through the port, or, alternatively, for indicating to the person, after connection of a patch cord, whether the connection complies, or not, with the electrical characteristics of the signal.

Other objects and advantages of the invention will become apparent as the description proceeds.

SUMMARY OF THE INVENTION

The present invention provides a method for managing cabling rooms that include a plurality of communication panels which are arranged closely to one another and each of which comprises a plurality of patch panels, typically structurally connected to form vertical structures. A plurality of patch cords, which carry information (e.g., data, audio, TV signals, etc.), is connected at one end to a port and at the other end to another port, said ports being located in different patch panels or in the same patch panel. The method of the invention automatically guides an operator to a communication panel or a plurality of communication panels, in which changes are to be made to modify the connectivity status or to deal with connectivity problems that may arise for any reason, e.g. moving a user to another location; a problematic connection due to defects of a patch cord, or any other reason.

The present invention also provides a method for automatically indicating to an operator optimal ports that are available and optimal patch cords for connecting them, based on distances between ports and on the electrical characteristics of the electrical signals that it is intended to pass between the ports.

Identifying the physical location and end-to-end connectivity of end-devices, which have a unique ID and which are, normally, connected to an access point of an information network, is known from the references cited above. Also known from these references are options for managing a related connectivity map/table and for guiding an operator through connectivity changes/errors by indicating the changes/errors to the person by using Connectivity Status Indicators that are assigned per port in the patch panels.

The present invention provides a method for managing a large scale cabling systems, which includes a plurality of communication panels, each of which could include a plurality of patch panels, which method comprises determining, by known systems, the changes to be made in the connectivity map of the system; signaling, in a manner immediately perceivable by an operator entering the room in which the cable system, or a part of it, is located, the communication panel or panels which are involved in the desired connectivity map changes; and signaling, in a manner immediately perceivable by an operator observing the said communication panel or panels, the ports in which said connectivity map changes are to be made.

Correspondingly, the present invention provides an apparatus which comprises one or more scanners, for obtaining the connectivity map and controlling it continuously, whereby to signal, among other things, if a mistake has occurred in changing said map; a master indicator or indicators, to which corresponding signal is forwarded, for indicating, in a manner immediately perceivable by an operator entering the room in which the cable system, or a part of it, is located, the communication panel or panels involved in connectivity changes; a connectivity status signal, to which corresponding signal is forwarded, for indicating, in a manner immediately perceivable by an operator observing the said communication panel or panels, the ports involved in connectivity changes; and a central management unit, for operating the scanners, optionally via a data network, and for activating, for each communication panel, said master indicator and said connectivity status indicators, and for generally controlling the connectivity status and its changes.

The master signals may be of any kind, but typically they may be optical and involve an alarm light attached to each communication panel. The port signals may be of any kind, but typically they may be optical and involve lights differently indicating the ports from which a patch cord is to be disconnected and the ports to which a patch cord is to be connected. For example, the disconnection signals may be a blinking light and the connection signals a steady light, or they may be lights of different colors, and the like, After the operator has done what the communication and port signals indicated that he should do, the scanners will check that he has operated correctly and that the new connectivity status is as desired, and if not, will alert the central management unit.

The operation of the invention is therefore practically automatic. The desired connectivity status changes are determined by a scanning system the conventional way and are communicated to the central managing unit. This latter activates the master indicators and connectivity status signals by forwarding corresponding signals, and the local operators need only follow the instructions of the signals.

In a preferred aspect of the invention, the scanners provide the central management unit with the {X, Y, Z} coordinates of every port in every patch panel in the cabling system. Whenever a change is to be made in the connectivity status of the system, the central management unit calculates the distances between ports that may be involved in the change. It may be that the same change or equivalent changes may be made by connecting a patch cord to one of several pairs of ports. The central management unit may choose, among said several pairs of ports, the optimal pair, the choice being based on the distance between ports and possibly on the type of patch cord required for each pair or on other considerations. The central management unit will then communicate to the operator, who performs the connectivity status change, the type and length of patch cord needed, so that he may acquire it from the available stock without uncertainties or delays.

According to one aspect of the present invention, the method for managing a cabling system further comprises managing secured links. By 'secured link' is meant herein a link that comprises two ports and a cord that interconnects them, and through which secret/secured information passes. The method, therefore, further comprises the steps of: (a) assigning a level of security, and updating the central management system with these levels; (b) identifying at least one of the following scenarios that could be involved in connection with secured links: (1) the cord is disconnected from one or two ports; (2) the same as scenario (1), but having the disconnected end(s) of the cord immediately reconnected to the original port(s); (3) one or two end(s) of a secured cord is transferred to a different port(s); (4) the same as (3), but having the transferred end(s) reconnected, after some delay, to the original port(s), (5) cutting the cord, which is equivalent to scenario No. (1); (c) In each one of these scenarios, the central computerized management system, which routinely initiates automatic scanning of every port at preferred intervals, will identify the connectivity change(s), and because the secured link is predefined (i.e., in the central management system) as having some level of security, the central management system will activate the corresponding connectivity status indicators and master indicators, or any other means, in a manner that will make these connectivity change(s) distinguishably perceivable by an operator. By 'distinguishably' is meant distinguished from normal, or other types of, connectivity changes.

According to another aspect of the present invention, the method for managing a cabling system further comprises "cleaning up" cabling systems. By "cleaning up" it is meant rearrangement of patch cords connections, which involve the steps of: (1) acquiring the current connectivity map of the cabling system; (2) removing all of the (old) connected cords; and (3) connecting (new) cords to equivalent, or to other alternative ports, or to the same ports in optimal manner, as described herein above. This way, links will comprise pairs of ports that are closer to one another, comparing to the original/old links, and cords that are shorter in general and better suited to these links. In cases where other ports (i.e., not equivalent ones) are to be used, the physical connectivity changes would have to be accompanied by corresponding logical changes in a corresponding active equipment management system. For example, if a telephone fine is found optimal (i.e., by central management system 31) if passing through different port(s), the different port(s) will be assigned the former (i.e., original) telephone subscriber number, By "equivalent port" is meant a port that is functionally identical to another port, and could be exploited instead of the other port. Equivalent port could reside in any other patch panel, in any other communication panel.

According to another aspect of the present invention, the method for managing a cabling system further comprises detecting "intruders". By "intruder" it is meant to an unauthorized person (e.g., Hacker) who connects a device, usually a portable computer, whose MAC address is not registered in (i.e., it is not known to) the central managing system, to the cabling system by directly, or indirectly, connecting the device to any of the ports of the cabling system, for accessing information. At least three basic scenarios are possible. According to a first scenario, the intruder connects a portable computer to an access point (e.g. in a remote room, with respect to the cabling room), which is connected, via static connection, to a port in the cabling system, through which information is accessible. With respect to the first scenario, the corresponding link, which comprises a cord and two corresponding ports and allows the intruder an access to the related data network, is registered in the management system as viable connection. However, because the MAC address of the computer of the intruder is not registered in the management system, the management system concludes that the connection between the related device and the port is illegitimate. According to the second scenario, the intruder makes a new link, by using a patch cord to interconnect between two ports in the cabling room, and connects a portable computer, or any other device, to a corresponding access point that is connected, via a static connection, to the new link, essentially in the same manner like in the first scenario. With respect to the second scenario, the new link is detected by the management system and recognized by it as illegitimate link, and the MAC address of the intruder's computer is also detected by the management system, and the intruders computer, or device, is recognized as illegitimate computer/device. According to the third scenario, the intruder connects a device directly to a port in the cabling room. With respect to the third scenario, the MAC address of the intruder's device, which is not registered in the management system, is detected and the intruder's device is recognized by the management system as illegitimate device. The management system is capable of identifying any of the above-described scenarios, and is configured to respond in any suitable way whenever an illegitimate link/connection and/or an unregistered device's MAC address are detected by the management system. For example, the management system could activate the corresponding connectivity status indicators and master indicators, or any other means, in a preferred way, and it could optionally cause other management systems to disconnect one of the ports involved in the unauthorized connection, so as to disconnect the intruders device from the information or data network.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
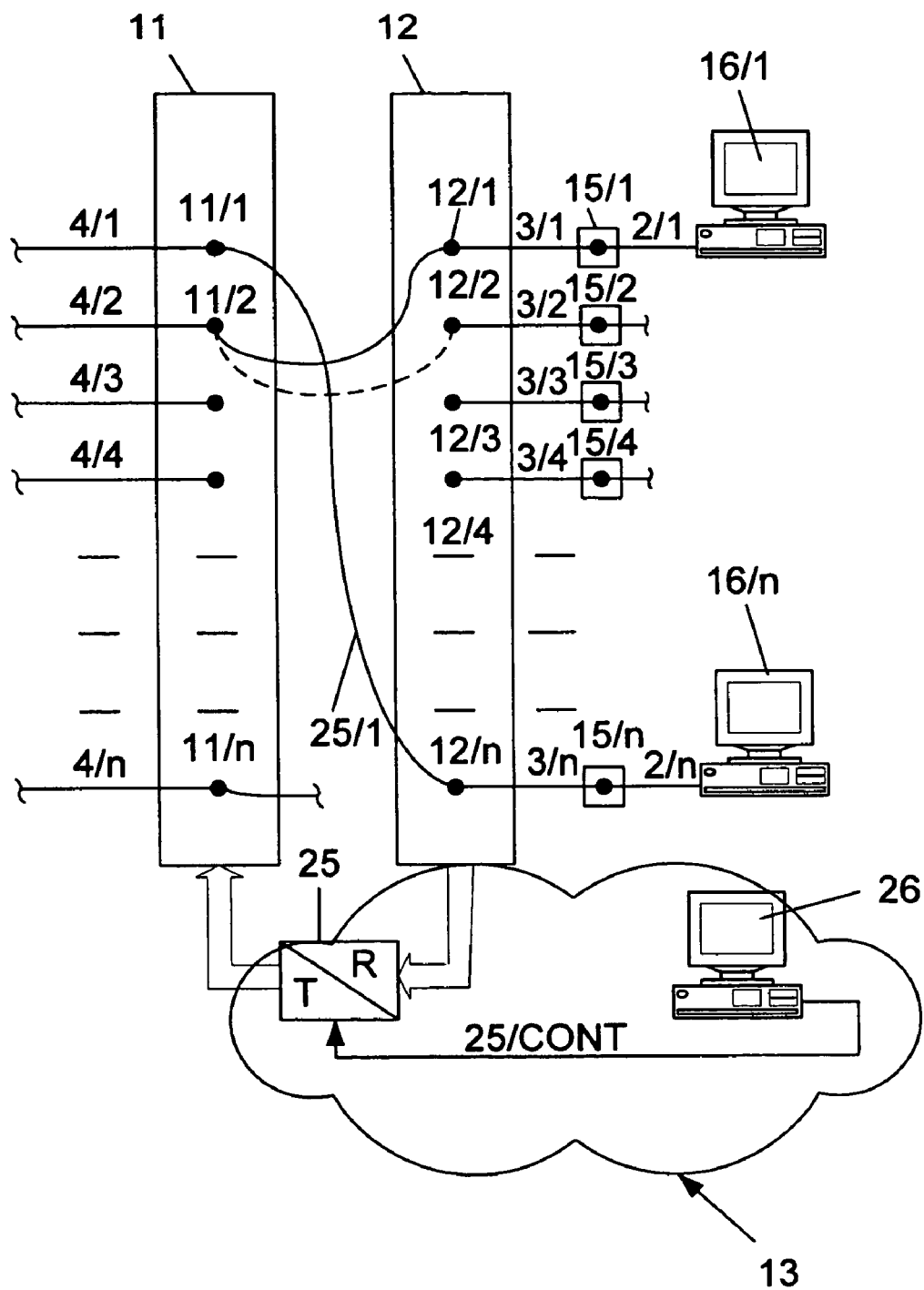
FIG. 1 schematically illustrates an exemplary layout of a scanning system for determining connectivity map of connections between two patch panels (prior art)

FIG. 1 schematically illustrates an exemplary basic scanning system for determining the connectivity map of connections between two patch panels (prior art). Patch panels 11 and 12 comprise data ports I to n. Static, data cables 4/1 to 4/n are connected a first set of separate contacts 11/1 to 11/n of panel 11. Said contacts 11/1 to 11/n are connected to a second set of contacts 12/1 to 12/n of panel 12 forming a cross-connection as indicated, for instance, by the connection of contact 11/1 to 12/n, as shown in the drawing. Predetermined contacts in the first set of contacts 11 and predetermined contacts in the second set of contacts 12 are cross-connected, for allowing flexibility in connecting end-devices (e.g. computer 16/n) to a corresponding remote end (not shown). Scanning system 13 typically comprises a scanner (25) and a computerized management unit (26) that synchronizes the operation of scanner 25 (i.e., via connection 25/cont) and handles the content of a connectivity table (not shown), in which the physical connectivity of end devices 16/1 to 16/n is contained. End devices 16/1 to 16/n are connected to panel 12 via access points 15/1 to 15/n and static data cables 3/1 to 3/n. The structure and functionality of scanner 25 will not be discussed any further, since they are described in detail in U.S. Pat. No. 5,483,467. In addition, different aspects of the principles of generation of the connectivity data and connectivity map, which include every connection existing between patch panel 11 and 12 (e.g., connection between ports 11/1 and 12/n, via patch cord 25/1), and handling the connectivity table are described in details in U.S. 60/251,444, WO 02/47331 and in co pending Israeli Patent Application Serial No. IL 152768, and, hence, will not be further described.

Figure 2:
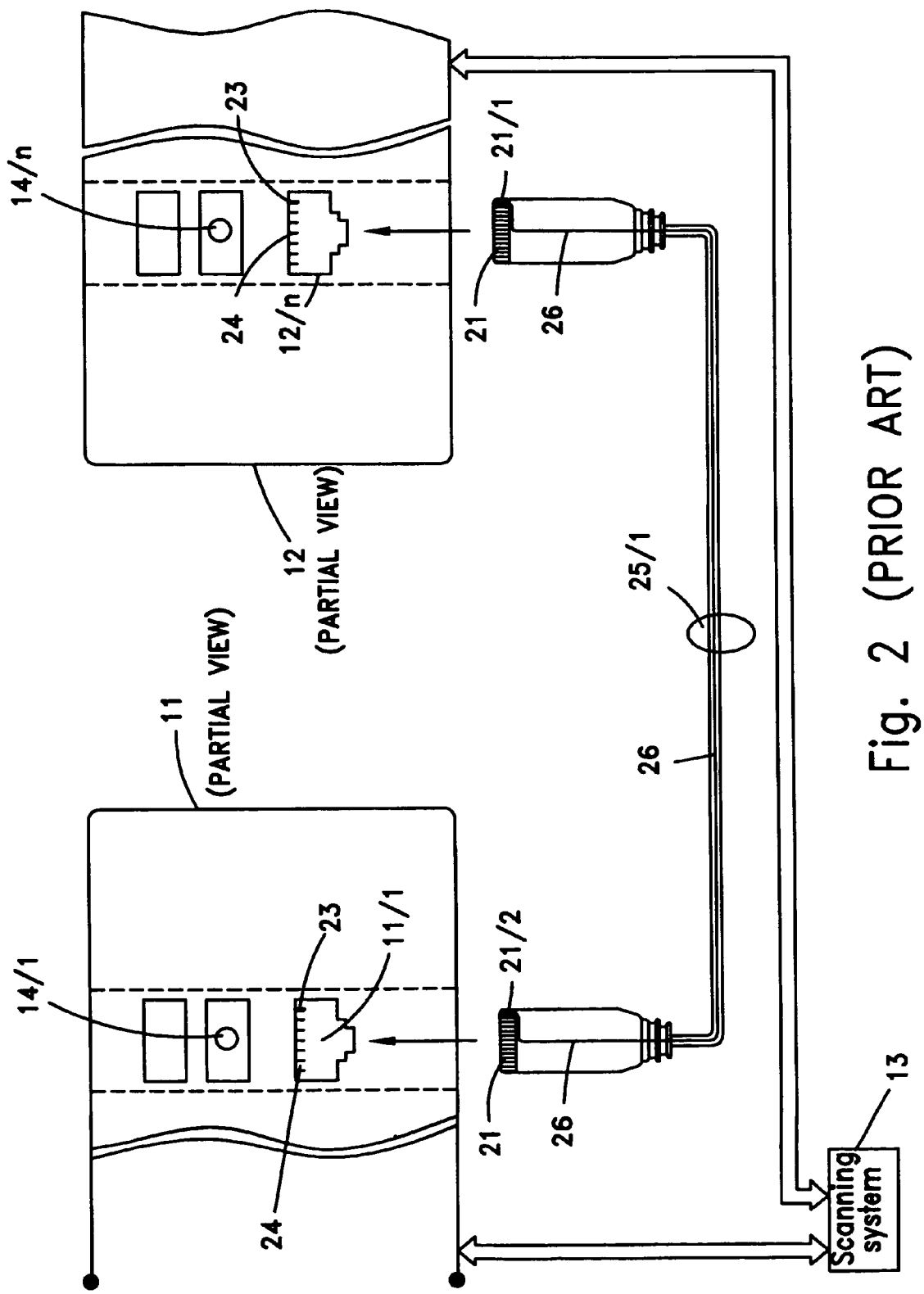
FIG. 2 schematically illustrates connecting between two manageable ports using a scannable patch cord (prior art)

FIG. 2 schematically illustrates connecting between two manageable ports using a patch cord containing a scanning wire (prior art). Ports 11/1 and 12/n of patch panels 11 and 12, respectively, are connectable via patch cord 25/1, which includes a scanning wire (26). Ports 11/1 and 12/n include data/audio contacts 24 and integral scanning contacts 23, which are electrically coupled to scanning wire 26 and form therewith a scanning route. Data/voice contacts 21 are intended to mate with the respective data/voice contacts 24. Scanning wire 26 and scanning contacts 23 (i.e., in ports 11/1 and 12/1) allow scanning system 13 to identify the connection between ports 11/1 and 12/n. Likewise, any connection, between any two ports, can be identified using the same principle. Reference numerals 14/1 to 14/n denote connectivity status indicators, the task of which is guiding a technician through wanted connectivity changes, and indicating erroneous and unauthorized connections, in a way described in, e.g., Israeli Patent Application Serial No. IL 152768.

Figure 3:
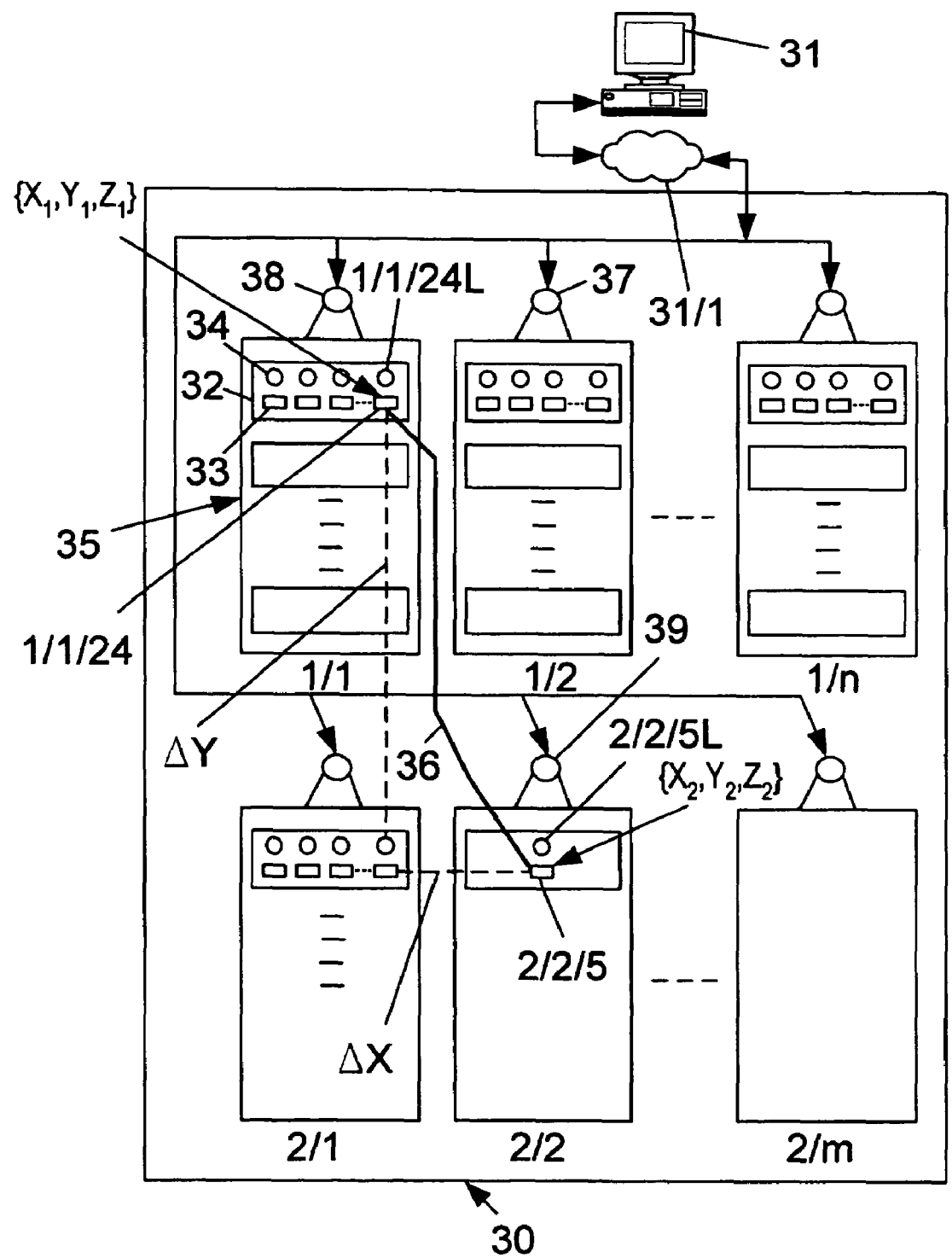
FIG. 3 schematically illustrates a general layout and functionality of the management system, according to the present invention.

FIG. 3 schematically illustrates a general layout and functionality of the cabling management system, according to a preferred embodiment of the present invention. Cabling room 30 includes a plurality of communication panels, such as communication panel 35, which normally includes a plurality of patch panels, such as patch panel 32, which normally includes a plurality of ports, such as port 33, which are assigned a connectivity status indicator, such as connectivity status indicator 34. The communication panels, in cabling room 30, are normally arranged in dense parallel lines, of which only lines 1 and 2 are shown, which include communication panels 1/1 to 1/n, and 2/1/ to 2/m, respectively, Having many communication panels densely assembled as schematically shown in FIG. 3, pose several problems that are related, in general, to the management aspects of the cabling system. For example, if two ports 1/1/24 and 2/2/5 are to be interconnected according to the required connectivity change, the technician updates the central management unit (i.e., 31), and the central management unit (31) forwards, e.g., via data network 31/1, a signal that will cause the respective indicators 1/1/24L and 2/2/5L to be active, for allowing the technician fast identification of the relevant ports (i.e., 1/1/24 and 2/2/5) to which patch cord 36 is to be connected. However, due to the large number of communication panels that are usually very close to one another, such visual inspection is inconvenient, laborious and time consuming, because the technician would have to visually inspect rather a large number of communication panels before reaching to the relevant communication panels and observing the activated (i.e., by, e,g., management system 31) connectivity status indicators, for example, connectivity status indicators 1/1/24L and 2/2/5L, in communication panels 1/1 and 2/2, respectively.

In order to direct the technician to the right communication panels, each communication panel is assigned an indicator ("Master Indicator"), such as master indicator 37, which is activated by, e.g., central management system 31, whenever at least one of the connectivity status indicators in the related communication panel is activated. Referring again to the example of patch cord 36 (i.e., ports 1/1/24 and 2/2/5 are to be interconnected), because indicators 1/1/24L and 2/2/5L will be activated, for indicating the requirement to interconnect ports 1/1/24 and 2/2/5, master indicators 38 and 39 will be also activated. This way, a technician entering cabling room 30 will be able, even by remote observation of the communication panels, to instantly identify the communication panels that are involved in the connectivity change(s), and a lot of inspection time (i.e., of non-relevant communication panels) will be spared.

In addition, master indicators may be operated regardless of the existence of connectivity status indicators, though other problems could arise due to the lack of the connectivity status indicators.

Another problem that is related to conventional large scale cabling systems, is the utilization of non optimal patch cords. That is, patch cords are currently chosen irrespective of the geographical/physical locations of the ports, and, as a consequence, patch cords are intuitively chosen by the technician in a way that their length is usually longer than required, a fact that deteriorates the quality of the communication link Other drawbacks of intuitive selection of patch cords are described herein before.

The present invention provides a method for selection of patch cords having lengths that are optimized to the signal requirements. According to this method, each port is assigned a corresponding geographical location, e.g., in the form of Cartesian coordinates $\{X,Y,Z\}$. For example, port 1/1/24 in communication panel 1/1 (FIG. 3) is assigned coordinates $\{X_1,Y_1,Z_1\}$, and port 2/2/5 in communication panel 2/2 is assigned coordinates $\{X_2,Y_2,Z_2\}$. Knowing the $\{X,Y,Z\}$ coordinates of the ports allowing central management system 31 calculating the distance between these ports, and offering to the technician a patch cord of appropriate length, which complies with the electrical characteristics of the signal that is intended to pass through the offered patch cord.

According to one aspect of the present invention, whenever there is a need to make a change in the connectivity of the cabling system in room 30 an operator indicates the required change to central management system 31, which, in turn, determines, from all the available ports, optimal ports for carrying out the required connection. The determination of the optimal ports is based on $\{X,Y,Z\}$ coordinates of all the available ports, and on the electrical characteristics of the signal that is intended to pass through the connection/link, The technician will have to choose, among the optimal ports, one pair of optimal ports. Next, the technician indicates to central management system 31 which pair of optimal ports he chooses, and central management system 31 will specify to the technician the preferred (i.e., optimal) type and length of the patch cord that is required for the specific connection. Next, central management system 31 forwards corresponding signals, via data network 31/1, to activate the connectivity status indicators (e.g., 1/1/24L, 2/2/5L) that are related to the specific connection. Central management system 31 concurrently causes activation of the respective master indicators, for guiding the technician directly to the communication panel of interest (e.g., 1/1, 2/2).

Usually, patch cords are arranged in vertical and/or horizontal cable trays. Accordingly, the offered patch cords could be calculated while considering this requirement. For example, the length of the patch cord that connects ports 1/1/24 and 2/2/5 could be calculated from ΔX, ΔY, and ΔZ (only ΔY and ΔX are shown in FIG. 3), Automatic calculation of the length of patch cords is advantageous in several aspects as described herein above.

The cabling management system described in FIG. 3 is also advantageous in terms of security of information streams. For example, suppose that secret/secured information passes through a secured link that comprises ports 1/1/24, cord 36 and port 2/2/5. Several scenarios are possible in connection with the (exemplary) secured link 36: (1) cord 36 has been disconnected from port 1/1/24, or 2/2/5, or both; (2) the same as scenario (1), but having the disconnected end(s) immediately reconnected to the original port(s); (3) one, or two, end(s) of cord link 36 has been transferred to a different port(s); (4) the same as (3), but having the transferred end(s) immediately reconnected to the original port(s); (5) cutting cord 36, which is equivalent to scenario No. (1). In each one of these scenarios, central computerized management system 31, which normally initiates automatic scanning (i.e., of every port in cabling room 30) at preferred intervals, will identify the respective connectivity change, and because the aforesaid secured link is associated with secret information, central computerized management system 31 will cause (according to this exemplary secured link) activation of connectivity status indicators 1/1/24L and 2/2/5L, and the corresponding master indicators (i.e., 38 and 39) or by activating any other alerting means. The activation of indicators 1/1/24L, 2/2/5L, 38 and 39 will be in a manner that will make these scenarios distinguishable from normal, or other types of, connectivity changes.

The cabling management system described in FIG. 3 is also advantageous in terms of "cleaning up" cabling systems. By "cleaning up" it is meant to rearrangement of interconnections, which involve the steps of: (1) acquiring the current connectivity map of the cabling system; (2) removing all of the (old) cords; and (3) connecting (new) cords to equivalent, or other, ports in optimal manner or connecting to the same ports in an organized manner, as described herein above. This way, links will comprise pairs of ports that are closer to one another, comparing to the original/old links, and cords that are shorter in general and better suited to these links. In cases where other ports (i.e., not equivalent ones) are to be used, the physical connectivity changes would have to be accompanied by corresponding logical changes in corresponding active equipment management systems. For example, if a telephone line is found optimal (i.e., by central management system 31) if passing through different port(s), the different port(s) will be assigned the former (i.e., original) telephone subscriber number. By "equivalent port" is meant to a port that is functionally identical to another port, and could be exploited instead of the other port. The equivalent port could reside in any other patch panel.

The cabling management system described in FIG. 3 is also advantageous in terms of detecting "intruders". By "Intruder" it is meant to an unauthorized person (e.g., Hacker) who connects a device, usually a portable computer, to the cabling system by directly, or indirectly, connecting the device to any of the ports of the cabling system. Three basic scenarios are possible. According to a first scenario, the intruder connects a portable computer to an access point (e.g., in a remote room, with respect to the cabling room), which is connected, via static connection, to a port in the cabling system, through which information is accessible. With respect to the first scenario, the corresponding link, which comprises a cord (e.g., cord 36, FIG. 3) and two corresponding ports and allows the intruder an access to the related data network, is registered in management system 31 as viable connection. However, because the MAC address of the computer of the intruder is not registered in management system 31, management system 31 concludes that the connection between the computer of the intruder and the port is illegitimate. According to the second scenario, the intruder makes a new link, by using a patch cord to interconnect between two ports in the cabling room, and connects a portable computer to a corresponding access point that is connected, via a static connection, to the new link, essentially in the same manner like in the first scenario. With respect to the second scenario, the new link is detected by management system 31 and recognized by it as illegitimate link, and the MAC address of the intruder's computer is also detected by management system 31, and the intruders computer is recognized as illegitimate computer. According to the third scenario, the intruder connects a computer directly to a port in the cabling room. With respect to the third scenario, the MAC address of the intruder's computer is detected and the intruder's computer is recognized by management system 31 as illegitimate computer. Every time an illegitimate link/connection, and/or an unregistered computer's MAC address is detected by management system 31, management system 31 could be configured to respond in any suitable way, for example, activating the corresponding connectivity status indicators and master indicators in a preferred way, and disconnecting one of the corresponding ports, so as to disconnect the intruder from the data network.

Figure 4:
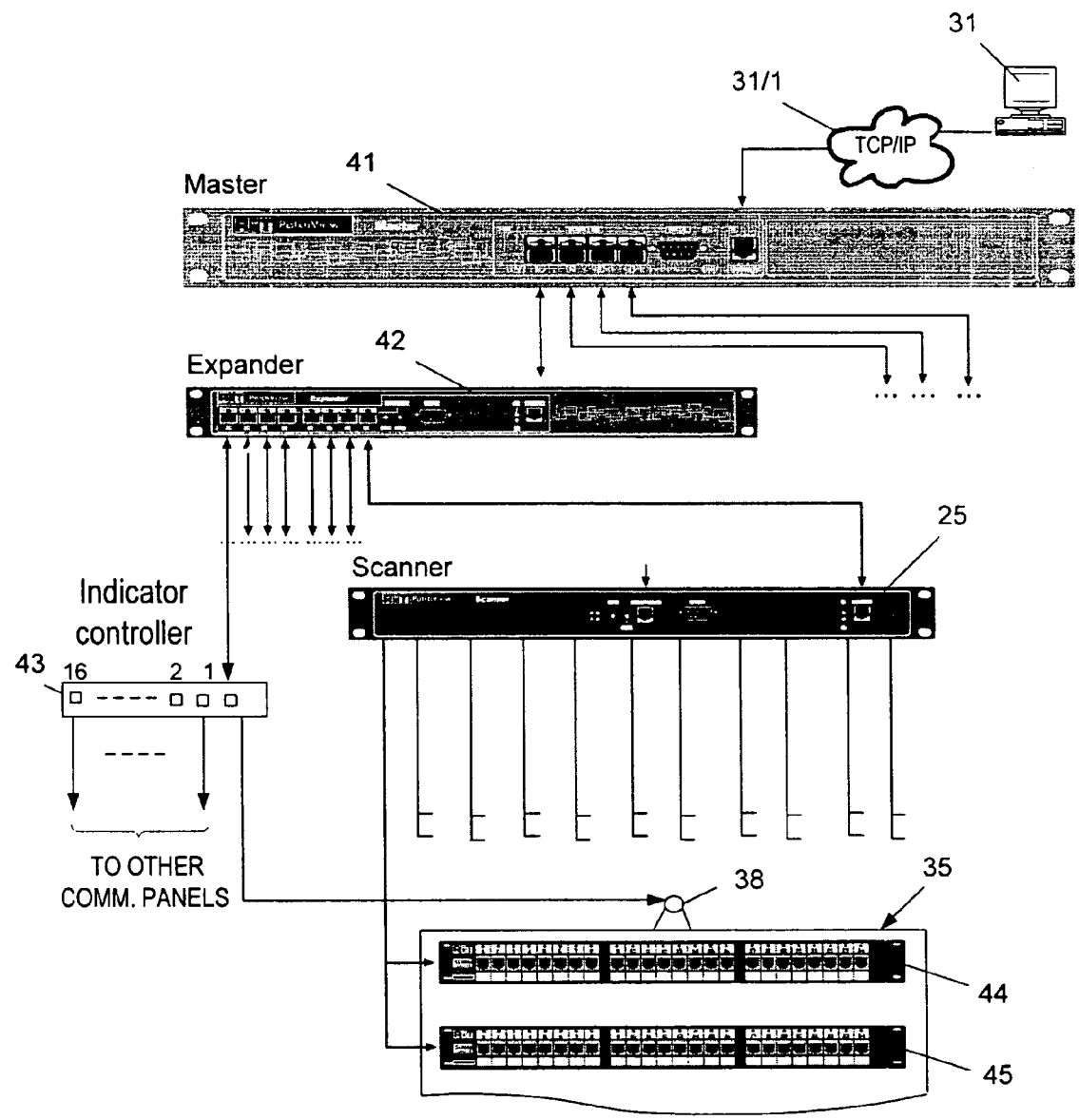
FIG. 4 schematically illustrates exemplary topology of a system for managing large scale cabling systems, according to an embodiment of the present invention.

FIG. 4 schematically illustrates exemplary topology of a system for managing large scale cabling systems, according to an embodiment of the present invention. The management system is typically arranged in hierarchical manner, as shown in FIG. 4. Central management system 31 cooperates, according to the example, with one master unit (41), via data network 31/1, Master unit 41 collects connectivity data from scanners, via expander unit(s), and forwards that data to central management system 31. Master unit 41 also distributes instructions in the opposite direction, including to indicator controllers such as indicator controller 43. More than one master unit may cooperate with central management system 31. Master unit 41, which is identifiable by central management system 31, could be connected to four expanders (only one is shown, 42). By "expander" is meant herein a communication device for intermediating between a master and one or more scanners, for allowing central management system 31 to manage more patch panels. Each one of the expanders, which is also identifiable by central management system 31, could be further connected to eight devices, which could be a combination of scanners, other expanders, and indicator controllers.

In FIG. 4, only one scanner and one indicator controller are shown (25 and 43, respectively). Scanner 25 could be connected, according to this example, to 22 patch panels, only two of which are shown (i.e., 44 and 45). Indicator controller 43 accepts instructions from master unit 41, via expander 42, to activate relevant master indicators, such as master indicator 38.

Utilizing master units, such as master unit 41, and expanders, such as expander 42, allow expanding the cabling system that is managed by central management system 31. Of course, other topologies are possible, which include different number of masters, expanders, scanners and indicator controllers.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A Method for managing a cabling system that include a plurality of communication panels arranged closely to one another, each comprising a plurality of patch panels structurally connected to form vertical structures, the method comprising automatically guiding an operator to one or more of said communication panels, in which changes are to be made to modify the connectivity status or to deal with connectivity problems; and automatically indicating to an operator optimal ports that are available and optimal patch cords for connecting them, based on distances between ports and on the electrical characteristics of electrical signals that are intended to pass between the ports.

2. A method for cable management of a cabling room, said room including a plurality of communication panels arranged closely to one another, each comprising a plurality of patch panels structurally connected to form vertical structures, the patch panels having ports, the method comprising:
   identifying one of the ports in the cabling room as a target port to which an operator should approach;
   sending from a central management unit a first signal to activate a master indicator located in proximity to one of the communication panels that comprises said target port to guide the operator to a vicinity of said target port; and
   sending from said central management unit a second signal to activate a status indicator located in proximity to said target port to guide the operator to said target port.

3. The method of claim 2, wherein sending said first signal comprises activating an alarm light.

4. The method of claim 2, wherein sending said second signal comprises activating an alarm light, said alarm light being indicative of whether to connect or disconnect said target port.

5. The method of claim 2, wherein sending said first and/or second signals comprises activating an alarm light, said alarm light being indicative of a predefined level of security of a link associated with said target port.

6. The method of claim 2, wherein sending said first and/or second signals occurs when a change in a link defined as a secured link between two of said ports is identified or when a modification of a link between two of said ports is required or when said ventral management unit identifies coupling of a device having a media access control (MAC) address not being registered in said management unit, to one of said ports.

7. The method of claim 2 automatically disconnecting a port identified as associated with an unauthorized link.

8. The method of claim 5, wherein sending said first and/or second signals occurs when said central management unit identifies a connection of a device having a media access control (MAC) address not being registered in said central management unit to an access point outside said cabling room, said access point being connected via a static connection to one of said ports.

9. The method of claim 5 further comprising:
   determining {X,Y,Z} coordinates of said ports relative to a reference point;
   calculating distances between candidate pairs of ports based on said {X,Y,Z} coordinates, said candidate pairs are candidates for connection; and
   choosing, based on said distances, one of said candidate pairs as a target pair and one port of said candidate pair as said target port.

10. The method of claim 9 further comprising:
   determining length of a patch cord required to connect said target pair based on the distance between ports of said target pair.

11. The method of claim 9 comprising:
   determining two of said ports as a target pair based on electrical characteristics of electrical signals intended to pass between said target pair.

12. The method of claim 9 comprising:
   acquiring current connectivity map of said ports;
   removing patch cords connected to said ports;
   determining a new connectivity map of said ports based on said current connectivity map and said distances; and
   connecting said ports based on said new connectivity map.

13. A Method for managing a cabling system that include a plurality of communication panels arranged closely to one another, each comprising a plurality of patch panels structurally connected to form vertical structures, the method comprising automatically guiding an operator to one or more of said communication panels, in which changes are to be made to modify the connectivity status or to deal with connectivity problems; and determining {X,Y,Z} coordinates of ports in said patch panels in the cabling system; whenever a change is to be made in the connectivity status of the system, calculating distances between ports that are involved in the change; choosing the optimal pair of ports; and communicating to the operator, the type and length of patch cord needed.

14. A Method for managing a cabling system that include a plurality of communication panels arranged closely to one another, each comprising a plurality of patch panels structurally connected to form vertical structures, the method comprising automatically guiding an operator to one or more of said communication panels, in which changes are to be made to modify the connectivity status or to deal with connectivity problems and managing secured links, which managing comprising: (a) assigning a level of security to said links, and updating management system the level of security; (b) identifying: (1) disconnection of a secured cord from one or two ports; and/or (2) the same as scenario (1), but identifying reconnection of the disconnected end(s) of said secured cord to the original port, and/or (3) identifying whether one or two ends of said secured cord is transferred to different port(s); and/or (4) the same as (3), but identifying reconnection of the transferred end(s) to the original port(s); and/or (5) identifying a cut secured cord, which is equivalent to scenario No. (1); and (c) activating, by said management system, corresponding master indicators and connectivity status indicators in a manner that will make connectivity change(s) distinguishably perceivable by the operator.

15. Method according to claim 13, which method further comprising "cleaning up" cabling systems, by performing the following steps; (1) acquiring the current connectivity map of the cabling system; (2) removing all of the connected cords: and (3) connecting cords to equivalent, or to other alternative ports, or to the same ports in optimal manner, wherein in cases where other alternative ports are involved in the physical connectivity changes, said physical connectivity changes being accompanied by corresponding logical changes in a corresponding active equipment management system.

16. Method according to claim 13, which method further comprising detecting "intruders", which detection comprises. (a) identifying connection of unauthorized device to an access point in a remote location, with respect to the cabling room, which is connected, via static connection, to a port in the cabling system, through which information could be accessible, by identifying the MAC address of the unauthorized device and concluding that said MAC address, which is not registered in the management system, belongs to illegitimate device; and/or (b) identifying an unexpected link in the cabling room, and the unregistered MAC address of a device tat is connected to a corresponding access point that is connected, via a static connection, to the new link, and, based on said unexpected link and said unregistered MAC address, concluding that said link is illegitimate, and said MAC address as belonging to unauthorized device; and/or (c) identifying direct connection of a device to a port in the cabling room, by identifying the MAC address of said device, which is not registered in the management system, and, based on said unregistered MAC address, concluding that said device is illegitimate, said management system being configured to respond to any of the scenarios (a) to (c), by activating the corresponding connectivity status indicators and master indicators in a preferred way, and, optionally, disconnecting one of the ports involved in the unauthorized link, so as to disconnect said device from said information.

17. A cable management system comprising:
   a plurality of communication panels, each comprises a plurality of patch panels, said patch panels having ports;
   a central management unit coupled to said communication panels;
   a plurality of master indicators, each master indicator is associated with a respective communication panel and located in proximity to its respective communication panel, said master indicator capable of being activated by said central management unit; and
   a plurality of status indicators, each status indicator being associated with a respective port and is located in proximity to said port, said status indicator is capable of being activated by said central management unit.

18. The system of claim 17, wherein said master indicator is an optical indicator comprising an alarm light attached to the respective communication panel.

19. The system of claim 17, wherein said status indicator is an optical indicator capable of producing light in different colon or different signaling patterns.

* * * * *